United States Patent [19]
Miyazaki

[11] Patent Number: 5,848,553
[45] Date of Patent: Dec. 15, 1998

[54] MOTOR DEVICE

[75] Inventor: Naomi Miyazaki, Okazaki, Japan

[73] Assignee: Asmo Co., Ltd., Kosai, Japan

[21] Appl. No.: 798,099

[22] Filed: Feb. 12, 1997

[30] Foreign Application Priority Data

Feb. 16, 1996 [JP] Japan .................................. 8-054188

[51] Int. Cl.⁶ .................................................. H02K 7/00
[52] U.S. Cl. ........................................... 74/42; 15/250.3
[58] Field of Search ................... 74/25, 42; 15/250.3, 15/250.31

[56] References Cited

U.S. PATENT DOCUMENTS

| | | | |
|---|---|---|---|
| 2,455,089 | 11/1948 | Perez | 74/70 |
| 2,861,457 | 11/1958 | Harrison | 74/42 |
| 5,203,219 | 4/1993 | Blanchet | 74/42 |
| 5,566,577 | 10/1996 | Klar | 74/42 |
| 5,622,077 | 4/1997 | Blanchet et al. | 74/42 |
| 5,655,405 | 8/1997 | Lerouge et al. | 74/42 |
| 5,685,195 | 11/1997 | Reinhardt | 74/42 |

FOREIGN PATENT DOCUMENTS

| | | |
|---|---|---|
| 2340090 | 5/1975 | Germany . |
| 8001379 | 7/1981 | Germany . |
| DE 3247421 | 9/1986 | Germany . |

| | | |
|---|---|---|
| 4-69358 | 6/1992 | Japan . |
| 4-127061 | 11/1992 | Japan . |
| 5-52421 | 7/1993 | Japan . |

*Primary Examiner*—Charles A. Marmor
*Assistant Examiner*—David Fenstermacher
*Attorney, Agent, or Firm*—Oblon, Spivak, McClelland, Maier & Neustadt, P.C.

[57] ABSTRACT

A motor device having a hollow casing in which a mechanism for converting continuous rotational motion of a rotating member into reversible rotational motion to transmit the converted motion to an output shaft. This motor device includes an oscillation member which oscillates around the output shaft. Further, it includes a driving force conversion member which is interposed between the oscillating member and the rotating member, and which converts the continuous rotational motion of the rotating member into reciprocating oscillatory motion of the oscillating member. This driving force conversion member includes a contacting portion which projects toward an inner wall of the hollow casing and which is formed integrally with the driving force conversion member. This contacting portion slides on the inner wall of the hollow casing over the range of displacement of the driving force conversion member, and moreover is formed from a material which is capable of absorbing sound generated by sliding motion. In this manner, it is possible to reduce sound such as vibrational noise and the like caused by sliding motion.

18 Claims, 8 Drawing Sheets

MOTOR DEVICE

BACKGROUND OF THE INVENTION

1. Field of the Invention

The present invention relates to a motor device, and more particularly to a wiper motor for an automotive vehicle.

2. Related Art

Known such motor devices are disclosed, for example, in Japanese Utility Model Application Laid-Open Nos. 4-69358 and 5-52421. General views of such a motor device are shown in FIGS. 8A and 8B.

Figure 8A:
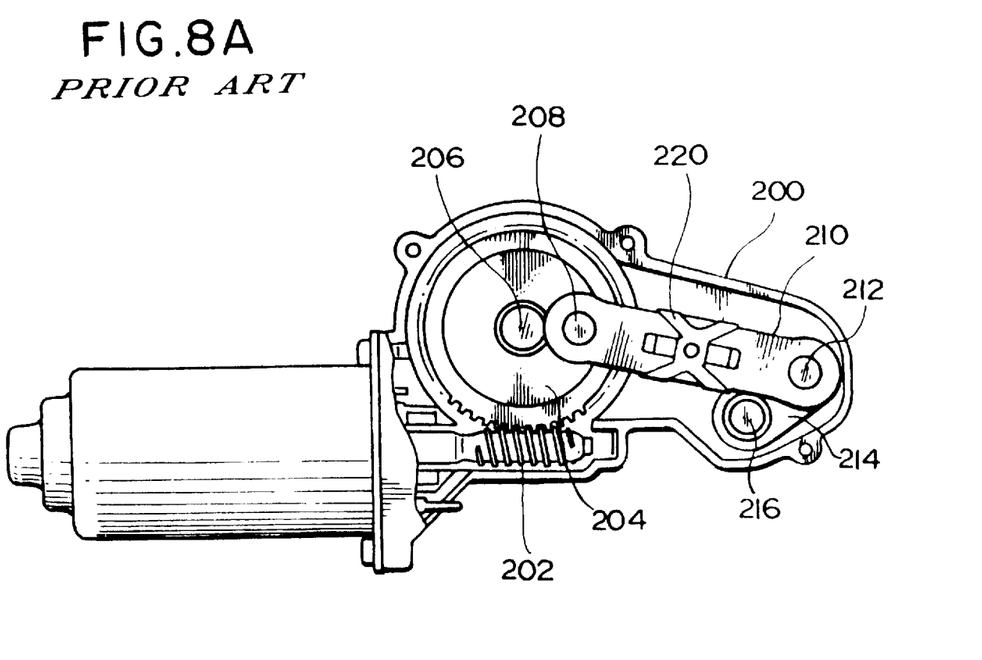
FIG. 8A is a partially cut away plan view showing a conventional motor device.

Referring to FIG. 8A, the motor device comprises, housed within a gear casing 200 which is connected to a motor section, a worm 202 connected to one end of a rotatable shaft which is provided in the motor section. A worm wheel 204 meshes with this worm 202 and the motor output is reduced by the worm 202 and the worm wheel 204. A crank pin 208 is provided at an eccentric position on the worm wheel 204, and accordingly pursues a circular path.

Further, to the crank pin 208 there is rotatably connected one end of a link connecting rod 210 which transmits the driving force of the worm wheel 204 to an output arm 214 which is connected to an output shaft 216. In this manner, when the worm wheel 204 rotates around the central axis of a gear shaft 206 on which it is mounted, this rotational motion is converted into a to and fro oscillatory motion by the link connecting rod 210.

Figure 8B:
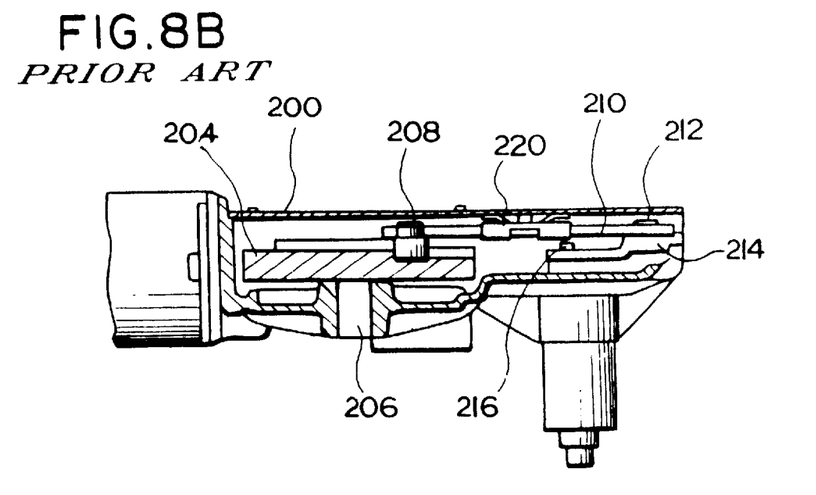
FIG. 8B is a partially cut away elevation view showing the motor device of FIG. 8A.

Further, as shown in FIG. 8B, a stress absorbing member 220 is provided on the central portion of the link connecting rod 210 in contact with the inner wall surface of the gear casing 200, and absorbs the stress in the direction perpendicular to the link connecting rod 210.

However, the following problems arise with the above described motor device.

(1) Except for the worm wheel 204, each of the parts is made of iron or steel. Because of this, noise due to play is generated during operation due to the metal upon metal sliding movements of, in particular, the various mutually sliding portions of the gear Shaft 206 and its shaft bearings (not shown in the figures), the link connecting rod 210 and the crank pin 208, the output shaft 216 and its shaft bearings (not shown in the figures), and so forth.

(2) Moreover, as one scheme for solving the above described problem point (1), it has been contemplated to fix wave washers or fixed rings for preventing play to the main above described various sliding portions. However, it is necessary to utilize a large number of such play reduction members, and it is considered that the cost will become unduly high due to the large number of parts.

(3) With the provision of the stress absorbing member 220 upon the link connecting rod 210, the inner wall surface of the gear casing 200 becomes worn away in a groove when the parts have mutually slid in the same mutual track for a long time, since the area of the contacting surfaces between the inner wall surface of the gear casing 200 and the stress absorbing member 220 is relatively small.

(4) Further, because the stress absorbing member 220 is provided at the central region of the link connecting rod 210, because the area of the contacting surfaces is small, the resistance against offset load and the like applied to the end regions of the link connecting rod 210 is not adequate. For this reason, the elements connected to either end of the link connecting rod 210, i.e. the worm wheel 204, the output arm 214 and so forth, cannot move in a stable manner but wobble, and due to this wobbling they generate noise due to mutual play.

(5) Since it is necessary additionally to provide the stress absorbing member 220, the number of parts is increased and the cost is increased during mass production of this motor device.

Yet further, for example, the related motor devices of German Patent DE2340090 and of German Utility Model DEG8001379 and so forth have been proposed, but the same problems as described in (3) and (4) above occur with these proposals as well.

Furthermore, a motor device is proposed in Japanese Utility Model Application Laid-Open No. 4-127061 and so forth, but this also is subject to the problem detailed in (2) above, and also, since a space is present above the output shaft, there is the problem, as included in (4) above, that the resistance to offset load is not adequate. Moreover, in these proposals, no complete disclosure is made of the various problems (1) through (5) detailed above.

SUMMARY OF THE INVENTION

The present invention was made with the view of solving the above described problems, and has as its objective the provision of a motor device in which the number of parts is reduced and the noise during operation is minimized, along with preventing vibration during mutual sliding motion of the various parts of a link mechanism which is included for reversibly rotating an output shaft.

The motor device of the present invention comprises a mechanism which converts continuous rotational motion of a rotational member which is rotated by a motor into reciprocating oscillatory motion which it transmits to an output shaft, and a hollow casing in which the mechanism is contained. It further comprises an oscillating member which oscillates about the output shaft as a central axis. Further, it comprises a driving force conversion member interposed between the oscillating member and the rotational member, which converts continuous rotational motion of the rotational member into reciprocating oscillatory motion of the reciprocating member. This driving force conversion member comprises at least one contacting portion which projects toward an inner wall of the hollow casing, and which is formed as one unitary body with the driving force conversion member. This contacting portion slides in contact with the inner wall of the hollow casing over the range of displacement of the driving force conversion member, and moreover is formed from a material which is capable of absorbing sound generated by sliding motion.

Because the contacting portion is formed on the driving force conversion member, it can reduce vibration in the thrust direction. Furthermore, this contacting portion is formed from a material which can absorb the noise due to sliding motion, so that it can reduce the abnormal noise, extraneous noise, and other noise.

Further, since the contacting portion is formed as one unitary body with the driving force conversion member, therefore it is not necessary to use any parts for holding together the construction or for restraining play such as circular clips, washers, a stress absorbing member or the like as were required in the prior art, and accordingly the number of parts used is reduced, whereby a reduction in cost can be achieved.

By forming the contacting portion on the driving force conversion member, it is possible to prevent formation of a groove along the path of displacement of the contacting portion on the inner wall of the hollow casing when the motor has been used for a long time period. Furthermore, it is possible properly to sustain offset load or the like upon the inner wall of the hollow casing, and accordingly play of the various members in the direction of thrust can be reduced.

The driving force conversion member of the motor device of this invention may be entirely, including the contacting portion, formed from a material which is capable of absorbing sound generated by sliding motion. By doing this, the driving force conversion member does not generate sound due to vibration by metal to metal contact as in the prior art when it is in contact with another metallic member such as the output shaft and the rotating member, and accordingly the noise when the motor is operating is reduced.

Further, the driving force conversion member may comprise a plurality of thickened portions and a thinned down portion which connects together these thickened portions, and in that each of the contacting portion is formed in the region of these thickened portions.

By forming a plurality of the contacting portions, vibration in the direction of thrust is reduced, and it is possible to reduce the occurrence of noise due to sliding motion. Further, a lightening of the driving force conversion member due to the existence of the thinned down portions may be anticipated.

Further, the thickened portions may be made from a nonmetallic material, with the thinned down portion being made from a metallic material.

By making the thickened portions having the contacting portion of a nonmetallic material, the noise generated by sliding motion can be absorbed. Further, by forming the thinned down portion which connects together the contacting portions from a metallic material, the rigidity of the driving force conversion member is enhanced.

Further, the driving force conversion member may be entirely made from a nonmetallic material. By doing this, the convenience for manufacture of the driving force conversion member is enhanced.

Further, the driving force conversion member may comprise an oscillation shaft which supports the oscillating member so that it can oscillate. The contacting portion of the driving force conversion member is formed at least in a region adjacent to where the oscillation shaft is provided.

A thrust load tends to be applied to the output shaft, and an offset load which is applied in the thrust direction tends to be applied to the oscillating shaft which is present in a position eccentric to this output shaft.

If the contacting portion is formed in a region adjacent to where the oscillation shaft is provided, offset load applied in the thrust direction can be supported by the contacting portion, and it is possible to reduce the noise due to vibration and the like in this region. Further, since it is now acceptable not to provide any separate contacting member as was the case in the prior art, accordingly the number of elements in the construction is reduced, and the cost during mass production can be reduced.

The driving force conversion member of the motor device of this invention may farther comprise a rotation shaft which supports the rotating member so that it can rotate. In this case, the contacting portion of the driving force conversion member is preferably formed at least in a region adjacent to where the rotation shaft is provided.

Accordingly, the vibration due to the thrust load which is applied to the rotation shaft can be reduced by this contacting portion.

The driving force conversion member may comprise an oscillation shaft which supports the oscillating member so that it can oscillate. And the same may further comprise a rotation shaft which supports the rotating member so that it can rotate. In this case, the contacting portion of the driving force conversion member is preferably formed at least in a region intermediate between the regions in which the oscillation shaft and the rotation shaft are provided.

By forming the contacting portion of the driving force conversion member in the region intermediate between the oscillation shaft and the rotation shaft, it is possible to absorb the noise generated in this intermediate region which is greatly vibrated. Furthermore, if the area of sliding contact is formed as large, the beneficial effect with regard to prevention of grooving of the inner wall surface of the hollow casing will be great.

Further, the driving force conversion member may comprise an oscillation shaft which supports the oscillating member so that it can oscillate. And the oscillation shaft comprises a contact portion which contacts a surface of the driving force conversion member on the side opposite to that on which the contacting portion us provided.

At the region of the oscillation shaft, the driving force conversion member can be supported as sandwiched between the engaging portion and the inner wall of the hollow casing. By doing this, it is possible to prevent the driving force conversion member from falling off or coming away, even although no retaining means such as a washer has been employed.

Further, the driving force conversion member may comprise a rotation shaft which supports the rotating member so that it can rotate. And the rotation shaft comprises a contact portion which contacts a surface of the driving force conversion member on the side opposite to that on which the contacting portion is provided.

At the region of the rotation shaft, the driving force conversion member can be supported as sandwiched between the engaging portion and the inner wall of the hollow casing. By doing this, the driving force conversion member can be prevented from falling off or coming away, even although no retaining means such as a washer has been employed.

Further, the driving force conversion member may comprise a first member which has a first hole into which an oscillation shaft which supports the oscillating member is inserted and a second hole into which a rotation shaft which supports the rotating member is inserted, and also a second member which is formed so as to cover both surfaces of the first member in the regions in which the first and the second holes are formed. Here this second member is formed as a sliding motion sound absorbing member.

The thickened portions can be formed as three layered structures of the second member above and below the first member.

And, the second member comprises a connecting portion which connects together the two contacting portions.

The rigidity of the driving force conversion member as a whole is enhanced by forming a two layered construction by the first and the second member in this manner, along with strengthening the connection in the region between the contacting portions.

Further, the rotating member may comprise a convex portion which is in sliding contact with another inner wall of the hollow casing which is opposed to the inner wall thereof against which the contacting portion is in sliding contact.

By providing this convex portion to the rotating member, it is possible for the rotating member to rotate stably. Also, along with reducing as much as possible the clearance which occurs in the thrust direction, it is possible further to reduce vibration in the direction of thrust by guaranteeing the contact between the driving force conversion member and the inner wall surface of the hollow casing.

This convex portion may be formed from a material which is capable of absorbing sound generated by sliding motion.

By forming the convex portion of the rotating member from a material which is capable of absorbing sound generated by sliding motion, thereby at least one of the two mutually sliding members can be made from a sound absorbing material while the other is made from a metallic material, and it is possible reliably to avoid the generation of noise due to metal to metal contact as was present with the prior art.

Further, the driving force conversion member may comprise a rotation shaft which supports the rotating member so that it can rotate, and each of the rotating member and the driving force conversion member has a hole portion which has a bottom into which a corresponding end portion of the rotatable shaft is inserted.

By the end portions of the rotatable shaft being inserted into the corresponding hole portions, offset load or the like which is experienced in the thrust direction on the side of the driving force conversion member is transmitted via the contacting portion to be borne by the inner wall of the hollow casing, and on the side of the rotating member is transmitted via the convex portion to be borne by the inner wall of the hollow casing; and, thereby, each member is enabled to move stably.

According to another aspect of the present invention, there is provided a wiper device comprising a motor device as described above. In this manner, when the wiper of the wiper device is being driven, it is possible to provide a quiet environment inside the body of, for example, an automobile or the like with a reduced noise due to vibration, by providing a motor device of the type described above in the wiper device.

According to another aspect of the present invention, there is provided a motor device, comprising a wheel gear which is housed within a hollow casing and is rotated by the output of a motor. And there is included an output shaft which is rotatably supported by the hollow casing. Further, there is included a sector gear which oscillates about the output shaft as an axis. And there is included a crank arm is which is formed integrally with the wheel gear. Furthermore, there is included a piston arm which converts continuous rotational motion of the crank arm into reciprocating oscillatory motion of the sector gear. The piston arm includes a contacting portion which projects toward an inner wall of the hollow casing and which is formed integrally with the piston arm. And the contacting portion slides in contact with the inner wall of the hollow casing over the range of displacement of the piston arm, and moreover is formed from a material which is capable of absorbing sound generated by sliding motion.

Since the contacting portion is provided on the piston arm, it is possible to reduce vibration in the direction of thrust. Additionally, this contacting portion is formed from a material which can absorb the noise due to sliding motion, so that it can reduce the abnormal sound and noises.

Further, since the contacting portion is formed integrally with the piston arm, it is not necessary to use any element for preventing detachment thereof such as a play restraining circular clip, a washer, a stress absorbing member as was required in the prior art, and accordingly the number of parts is reduced, whereby a reduction in cost is anticipated.

And, according to yet another aspect of the present invention, by providing a wiper device comprising a motor device as described above, it is possible to provide a quiet environment while the wiper is being driven in, for example, the body of a vehicle, with a reduced noise due to vibration or the like.

DESCRIPTION OF PREFERRED EMBODIMENTS

The present invention is now described in terms of a number of preferred embodiments, with reference to the drawings.

First Embodiment

Figure 1:
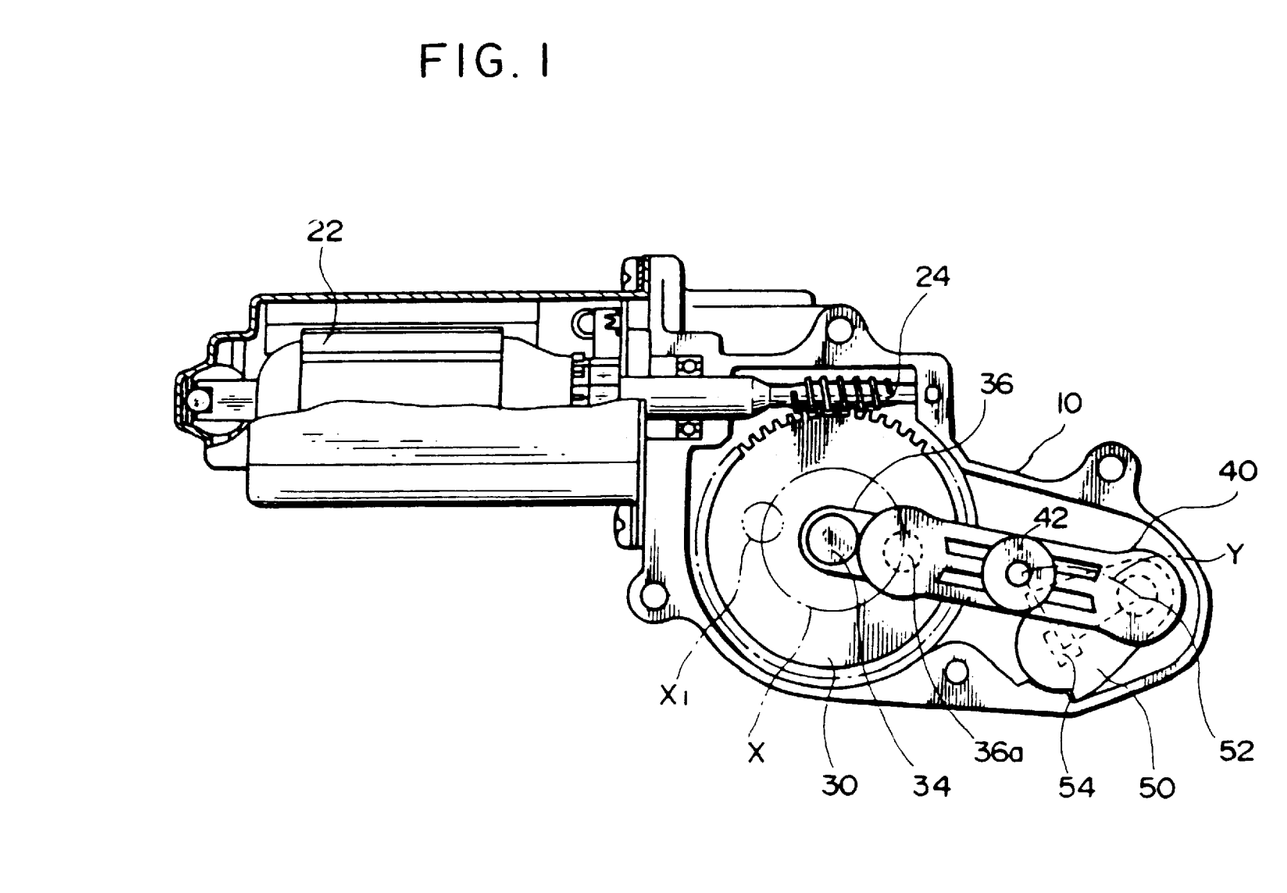
FIG. 1 is a partially cut away plan view showing an exemplary embodiment of the motor device of the present invention.
Figure 2:
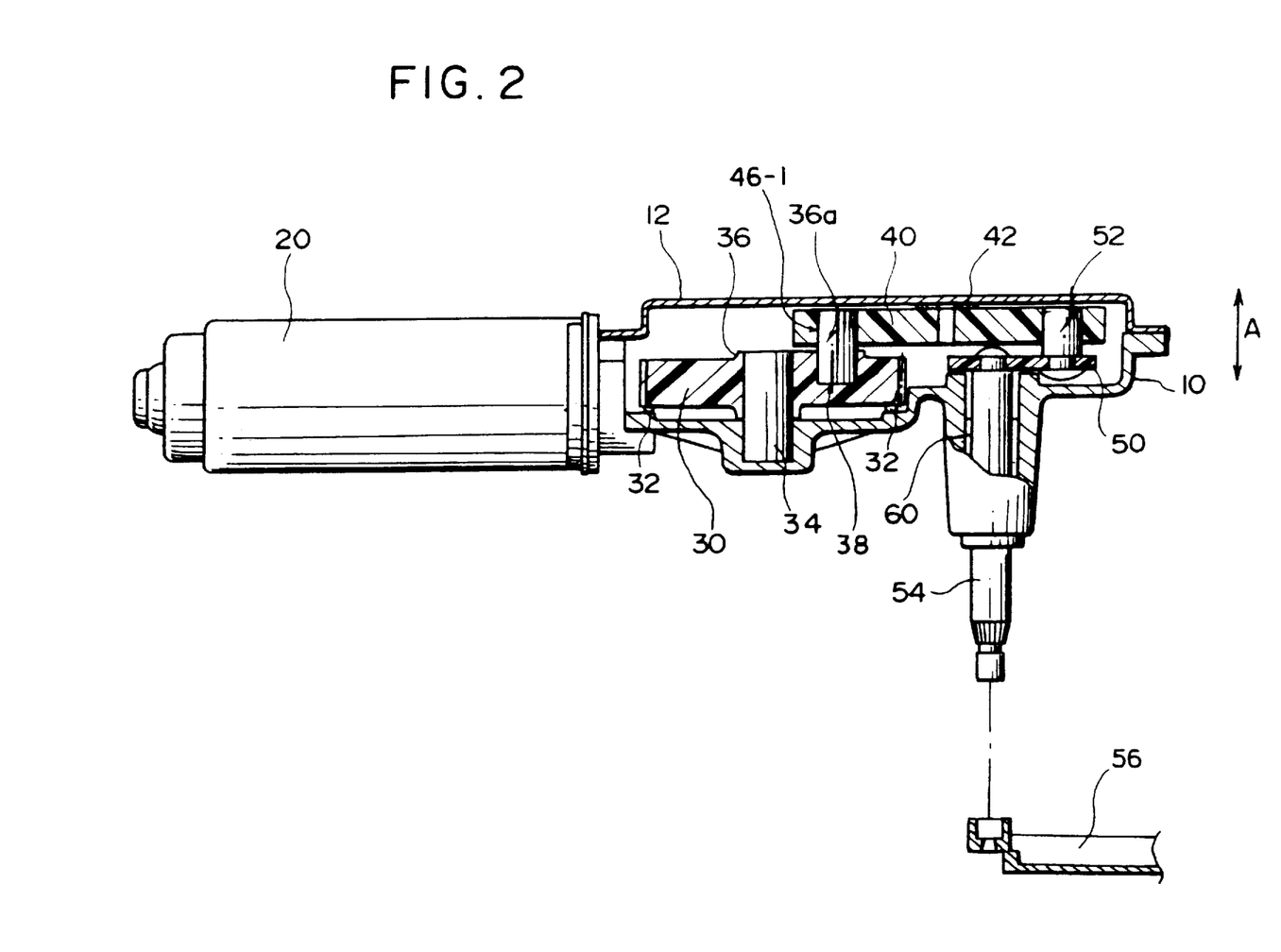
FIG. 2 is a partially cut away elevation view showing the motor device of FIG. 1.

First, the overall structure of the motor device of the present invention will be explained using FIGS. 1 and 2. FIG. 1 is a partially cut away plan view showing an embodiment of the motor device according to the present invention, while FIG. 2 is a partially cut away elevation view showing the motor device of FIG. 1.

As shown in FIG. 1, the motor device of the present invention has a hollow casing 10 in which is housed a mechanism for converting the continuous rotational motion of a rotating member to oscillating motion of an output shaft. The motor device also comprises a motor 22 and a worm 24 which rotates along with the rotational shaft of the motor section. There are further provided a worm wheel 30 which serves as a member rotating around the gear shaft 34 as a center and which meshes with the worm 24 and rotates at a reduced rotational speed, and a crank arm 36 which is formed as one unit on said worm wheel 30. And a crank pin 36a is fixed to the crank arm 36 so as to be freely rotatable, thus serving as a rotating shaft. Further, a sector gear 50 is provided as engaged with the output shaft 54 and serves as an oscillating member.

Moreover, interposed between the crank pin 36a and the sector gear 50, there is provided a driving force conversion member or piston arm 40 which transmits the continuous rotational movement of the crank pin 36a to the output shaft 54 while converting it into reversible rotation.

Now, the hollow casing 10, which may serve as the gear housing, may be formed for example as a metallic member, or from resin material or the like. Further, as shown in FIG. 2, a cover 12 made from a metallic material is fixed over the hollow casing 10, and conceals the various mechanisms therein. Moreover, a wiper 56 is fixed upon the output shaft 54, and serves as a driven member.

As shown in FIG. 2, the worm wheel 30 rotates around the gear shaft 34 whose lower end is fixed to the bottom wall of the hollow casing 10 by being pressed thereinto, and this worm wheel 30 has a smooth surface and moreover is manufactured from some material which absorbs the noise of sliding motion, for example from a resin material or the like. Moreover, the gear shaft 34 is made from a metallic material, and the worm wheel 30 is rotationally driven while the gear shaft 34 remains fixed.

Further, a ring shaped axially projecting portion 32 is provided upon the lower surface of the worm wheel 30 which opposes the inner wall of the hollow casing 10 in the vicinity of the outer circumferential edge thereof. Tilting of the worm wheel 30 is prevented by this convex portion 32 sliding against the inner wall of the hollow casing 10, and it is possible to rely upon reduction of the noise of sliding motion to a minimum.

On the other hand, a crank arm 36 which is linked with a driving force conversion member 40 is formed integrally with the upper surface of the worm wheel 30 which opposes the cover 12. An aperture is formed through the crank arm 36 at a position thereof displaced from the gear shaft 34, and a crank pin 36a which is connected to one end of the driving force conversion member 40 is inserted into this aperture. It should be noted that this crank pin 36a is desirably made of a metallic material.

The driving force conversion member 40, as shown in FIG. 1, is connected to the crank arm 36 by the crank pin 36a and is in contact with the inner wall surface of the cover 12. Further, the driving force conversion member 40 of the present embodiment, which has the function of conversion of the continuous rotational movement of the worm wheel 30 into the oscillatory movement of the sector gear 50 and the reversible rotational motion of the output shaft 54 to transmit the output drive force, is formed as a crank-piston mechanism. Moreover, this driving force conversion member 40 has a contacting portion 42 which is formed from a material which is capable of absorption of the noise of sliding motion, for example from a resin material such as polyacetal or the like, and is in contact with the inner surface of the cover 12. This contacting portion 42 is formed as an integral unit with the driving force conversion member 40, and is a thickened portion thereof formed as a ridge of thickness roughly equal to the clearance between the inner surface of the cover 12 and the upper surface of the driving force conversion member 40. Further, the driving force conversion member 40 comprises a shaft fixing portion fo, fixing shafts such as the crank pin 36a and a pin 52, and thinned down portions 48 formed as somewhat reduced in thickness so as not to be in contact with the inner surface of the cover 12.

One end of the driving force conversion member 40 oscillates to and fro in an arc about the output shaft 54 as center, while its other end moves in a circle about the gear shaft 34 as center.

Figure 3A:
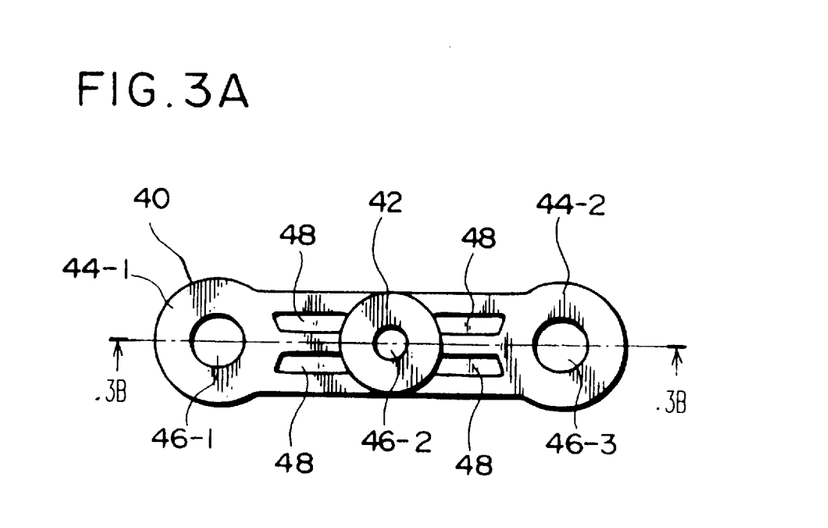
FIG. 3A is a plan view showing a driving force conversion member of the motor device of FIG. 1, an FIG. 3B is a sectional view taken as shown by the line B—B in FIG. 3A.
Figure 3B:
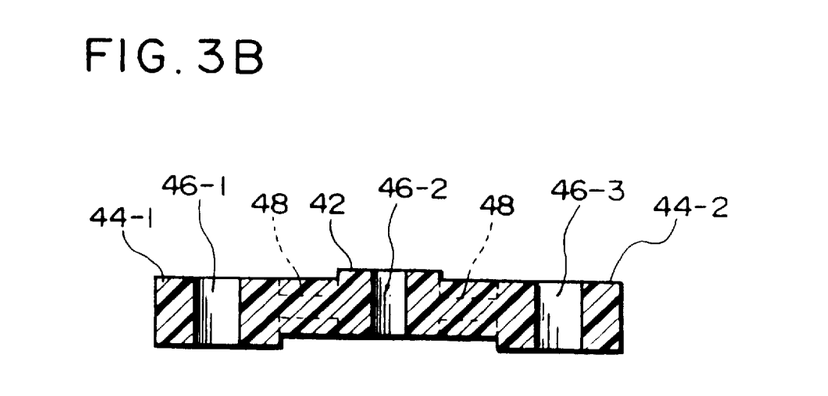

The driving force conversion member 40 is in contact with the cover 12 only through the contacting portion 42. At least one contacting portion is provided on the driving force conversion member 40, as shown in FIGS. 3A and 3B.

A thrust load caused by contact pressure between the wiper 56 and a windshield not shown in the figure tends to be applied to the output shaft 54, and an offset load in the thrust direction tends to be applied to the pin 52 which is present in a position eccentric to this output shaft 54.

In this embodiment, by forming the contacting portion 42 in this region, vibration in the direction of thrust (the direction shown in FIG. 2 by the arrow A) caused by this offset load can be supported by the inner surface of the cover 12. It is also possible to reduce vibration at the driving force conversion member 40 and the worm wheel 30.

Moreover, since the contact is between the inner surface of the cover 12 which is made from a metallic material and the contacting portion 42 which is made from a resin material (for example), accordingly the noise of metal to metal contact such as occurred in the prior art can be prevented, and instead sliding is established favorably and smoothly.

The contacting portion 42 may be formed in the vicinity of the pin 52, in the vicinity of the crank pin 36a, and in the middle area between the pin 52 and the crank pin 36a.

The shaft fixing portion is formed as a plurality of regions, for example two (44-1 and 44-2), at both ends of the conversion member 40, which have holes formed through them into which the shafts such as the crank pin 36a and the pin 52 can be inserted so as to be freely rotatable therein, and which thus link together the driving force conversion member 40 and the sector gear 50 and the crank arm portion 36 in a mutually freely rotatable manner.

That is to say, as shown in FIGS. 3A and 3B, holes 46-1 and 46-3 are formed through both the ends of the driving force conversion member 40, and for example the crank pin 36a is fitted through the hole 46-1 while the pin 52 which serves as a shaft for to and fro oscillation is fitted through the hole 46-3. Now, the crank pin 36a and the pin 52 may be made of a metallic material.

Furthermore, it would also be acceptable to construct the upper sides of the holes as closed. In this case, the hole 46-1 in the driving force conversion member 40 of FIG. 2 can be constructed as a hole with a bottom. Further, the crank pin 36a is held in by the pair of concave shaped holes above and below it, by the hole 46-1 and by the hole 38 in the worm wheel 30. By doing this, offset loads or the like experienced in the upwards and downwards thrust directions (the directions A in FIG. 2) are transmitted, in the upward direction, to the cover 12 via the contacting portion 42, and, in the downward direction, to the inner wall of the hollow casing 10 via the convex portion 32; and, accordingly, all of the members are enabled to execute their motions in a stable fashion.

The insertion holes are formed at the centers of the contacting portion 42 and the shaft fixing portions, and the crank pin 36a and the pin 52 are respectively inserted into the insertion holes 46-1 and 46-3, while nothing is inserted into the insertion hole 46-2. It would also be acceptable not to provide the insertion hole 46-2 at all.

When the driving force conversion member 40 is operating, it is possible to reduce the noise due to the contact between the outer circumferential surfaces of the crank pin 36a and the pin 52 which are made of metallic material and the inner surfaces of the holes 46-1 and 46-3 which are for example made of resin material, as compared with the prior art in which this contact was metal to metal, and moreover this contact is smooth.

Because the thinned down portions 48 are formed thinner than the surface in general, thereby the amount of material used is reduced, and accordingly reduction of cost can be anticipated. Further, ribs are formed to link the fixing portions with the contacting portion 42 solidly.

The sector gear 50 is formed of a metallic material and opposes the inner wall of the hollow casing 10, and on its one end it is linked with the driving force conversion member 40 via the pin 52, while on its other end it is coupled to the output shaft 54 which is pressed thereinto and caulked, or the like; and thereby it functions to transmit the to and fro movement of the driving force conversion member 40 to the output shaft 54, and moves as one unit with the output shaft 54.

A shaft bearing 60 for the output shaft 54 has a smooth surface and is formed from a material which is capable of absorbing the noise of sliding movement, for example from a resin material. Because of this, the noise due to vibration of the output shaft 54 which rotates reversibly can be reliably reduced.

As described above, in the region including the output shaft 54 of this device, the contacting portion 42 which is in contact with the inner wall of the cover 12 supports firmly the parts of the device in the direction of the thrust (the direction A in FIG. 2) to reduce the noise due to the vibration caused by rotation of the output shaft 54.

Further, in the region including the worm wheel 30, the contacting portion 42 and the convex portion 32 which is in contact with the inner wall of the hollow casing 10 support firmly the parts of the device in the direction of the thrust (the direction A of FIG. 2) to reduce the noise due to the vibration caused by motions of the worm wheel 30 and the driving force conversion member 40.

The structure of this first preferred embodiment is as described above; its operation will now be described with reference to FIGS. 1 to 3.

The armature 22 in the motor housing 20 which abuts upon the hollow casing 10 is rotated, and the motor output is reduced by the worm wheel 30 which as shown in FIG. 1 meshes with the worm 24. At this time, tilting of the worm wheel 30 is prevented by the convex portion 32 contacting with the inner wall surface of the hollow casing 10, as shown in FIG. 2, and the noise due to vibration is reduced.

Next, the worm wheel 30 rotates about the axis of the gear shaft 34, and the crank pin 36a revolves following the path shown by X in FIG. 1, and one end of the driving force conversion member 40 revolves along therewith, and the other end of the driving force conversion member 40 executes to and fro motion, following the oscillation path Y. At this time, since this other end of the driving force conversion member 40 performs oscillatory to and fro motion, the sector gear 50 which is linked therewith also in the same way performs oscillatory motion, and thereby the output shaft 54 rotates reversibly.

Here, when the driving force conversion member 40 is in the state shown in FIG. 1, in the region including the output shaft 54, the contacting portion 42 which contacts with the inner surface of the cover 12 and the sector gear 50 provide firm retainment in the thrust direction (the direction A in FIG. 2), as a result of which it is possible to maintain operation with all the parts stably without the occurrence of any play. Further, noise is reduced.

On the other hand, when the driving force conversion member 40 is in the position X1 in FIG. 1, in the region of the worm wheel 30, since the contacting portion 42 which contacts with the inner surface of the cover 12 and the convex portion 32 which is contacting with the inner wall of the hollow casing 10 provide firm retainment in the thrust direction (the direction A in FIG. 2), accordingly it is possible to maintain operation with all the parts stably without the occurrence of any play. Further, noise is reduced.

Yet further, in either of the above described states, since each of the pairs 3f parts which mutually slide upon one another (the shaft bearing 60 and the output shaft 54; the cover 12 and the driving force conversion member 40, and the worm wheel 30 and the inner surface of the hollow casing 10) consists of a combination of a metallic material and a material which can absorb noise due to sliding motion (for example a resin material), accordingly it is possible to reduce the noise due to sliding motion, in comparison with the case of mutual sliding motion between two members both of which were made of a metallic material such as in the case of the prior art.

According to this first embodiment of the present invention as described above, the following beneficial effects are obtained.

(1) Vibration of the various members of the mechanism in the direction of thrust, and the noise due to such vibration, can be reduced. Further, the wearing of a groove on the inner surface of the cover by the driving force conversion member is prevented as compared to the case as with the prior art in which the cover is made of a resin material, and the offset load or the like can be sufficiently supported by the inner wall of the hollow casing. And, furthermore, since it is possible to utilize the driving force conversion member for two purposes without providing any stress absorbing member as was the case with the prior art, thereby the number of elements in the construction is reduced, and accordingly a reduction in cost may be anticipated.

(2) By forming the contacting portion on a part of the driving force conversion member, the size of the face contact area with the inner wall surface of the hollow casing is reduced, and so it is possible to prevent abrasion of the driving force conversion member, even when properly supporting offset load or the like.

(3) By the driving force conversion member itself being formed from the material which is capable of absorbing noise generated due to sliding motion, when this driving force conversion member slides against the other member which is made from a metallic material, for example the output shaft or the crank pin, then vibrational noise is reduced as compared to the case as with the prior art in which two metallic surfaces slid against one another.

(4) By providing the convex portion upon the worm wheel, the worm wheel can rotate in a stable manner. Moreover, it is possible to reduce vibration in the direction of thrust by reducing as much as possible the clearance which occurs in the thrust direction.

(5) By forming the convex portion from a material which is capable of absorbing the sound of sliding motion, it is possible reliably to prevent the generation of noise due to metal to metal sliding contact such as occurred with the prior art.

(6) By forming the shaft bearings from a material which is capable of absorbing the sound of sliding motion, it is possible reliably to prevent the generation of noise due to metal to metal sliding contact such as occurred with the prior art.

(7) Each of the pairs of parts which mutually slide upon one another (the shaft bearing 60 and the output shaft 54, the cover 12 and the contacting portion 42, and the worm wheel 30 and the inner surface of the hollow casing 10) is a combination of a material which can absorb noise due to sliding motion (for example a resin material) and a metallic material. Due to this, it is possible to reduce the noise due to sliding motion during operation, both from the point of view of sound pressure level and also from that of tone quality, in comparison with the case of mutual sliding motion between two members both of which were made of a metallic material such as in the case of the prior art.

(8) In the case that the construction is such that the upper ends of the holes formed in the driving force conversion member are closed, then the hole 46-1 and the hole 38 in the worm wheel 30 constitute a pair of downwardly and upwardly facing concave holes. By the crank pin being held in the space defined between these holes, force such as offset load experienced in the thrust direction (the direction shown by A in FIG. 2) can be transmitted to and borne by, in the upwards direction, the contacting portion, and in the downward direction, the convex portion.

In this manner, the driving force conversion member is supported by the cover through the contacting portion, and the worm wheel is supported by the hollow casing through the convex portion. Further, the crank pin is held between the driving force conversion member and the worm wheel in their respective bottom-closed holes. In this manner, for fixing together the various members, there is no need to employ parts such as circular clips, washers, stress absorbing members, or the like as was the case with the prior art, and thereby it is possible to anticipate a reduction in cost due to decrease in the number of constructional elements.

(9) If the contacting portion is formed in the region in which the oscillation shaft 52 is provided, offset load applied in the thrust direction can be supported by this contacting portion, and it is possible to reduce the noise due to vibration and the like in this region. In addition, if the contacting portion is formed as comparatively large, it is possible to prevent grooving of the inner wall surface. Further, since it is also acceptable not to provide any separate contacting member as was present in the prior art, therefore the number of parts in this device is reduced, and it is possible to reduce the cost of mass production thereof.

If the contacting portion is further formed in the region of the rotational shaft 36a and in the region intermediate between the oscillation shaft 52 and the rotational shaft 36a in addition to the region of the oscillation shaft 52, a stronger load can be supported, and it is possible to realize the same operational benefits as described above.

Second Embodiment

Next, a second embodiment of the motor device of the present invention will be described. In this second preferred embodiment, as shown in FIGS. 4A and 4B, a contacting portion is formed at both ends of the driving force conversion member.

Figure 4A:
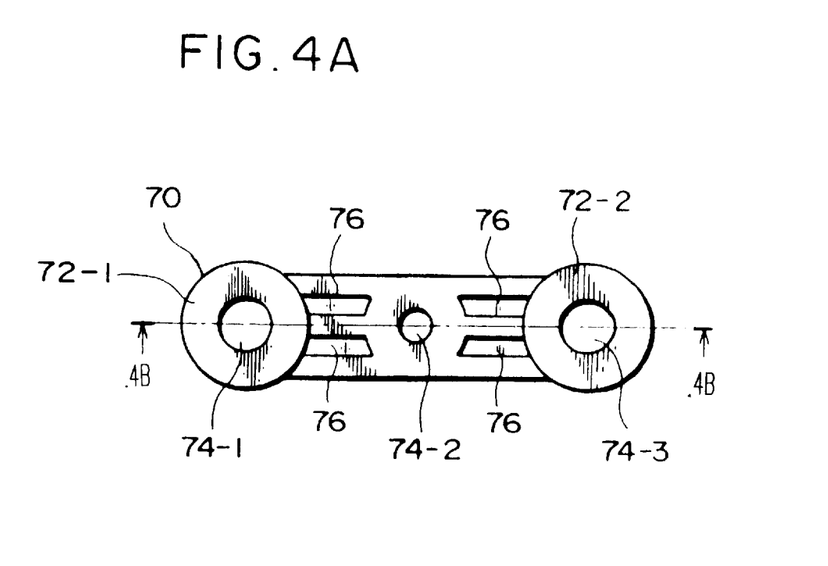
FIG. 4A is a plan view showing a driving force conversion member of another preferred embodiment of the motor device of the present invention.
Figure 4B:
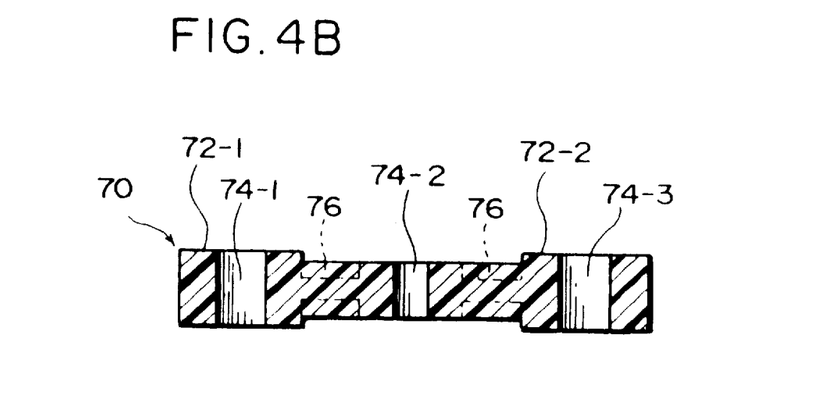
FIG. 4B is a sectional view taken as shown by the line C—C in FIG. 4A.

In FIGS. 4A and 4B, the driving force conversion member 70 comprises contacting portions 72-1 and 72-2 which are in contact with the inner surface of the cover 12, and also comprises thinned down portions 76.

As shown in FIGS. 4A and 4B, the contacting portions 72-1 and 72-2 are separately provided at opposite ends of the driving force conversion member 70. By doing this, vibration in the thrust direction (the direction A in FIG. 2) can be borne by the inner surface of the cover 12, and it is possible to prevent the occurrence of play in the region of the output shaft 54 and in the region of the worm wheel 30.

Because the thinned down portions 76 are formed thinner than the surface in general, the amount of material used is also reduced, and so does manufacturing cost. Further, ribs are formed to link the contacting portions 72-1, 72-2 solidly.

Third Embodiment

Figure 5A:
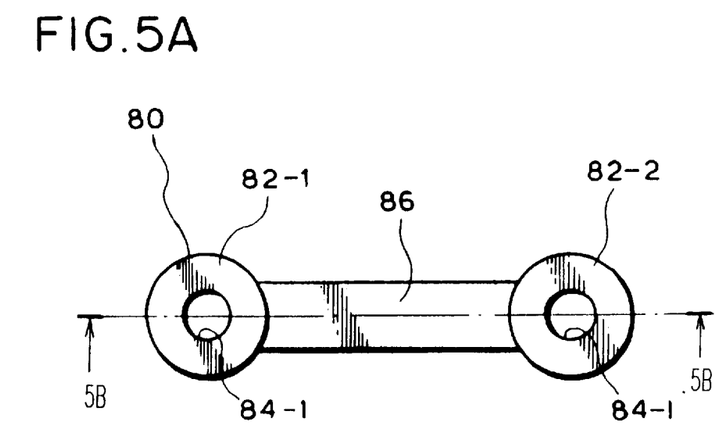
FIG. 5A is a plan view showing a driving force conversion member of yet another preferred embodiment of the motor device of the present invention, and FIG. B is a sectional view taken as shown by the line D—D in FIG. 5A.
Figure 5B:
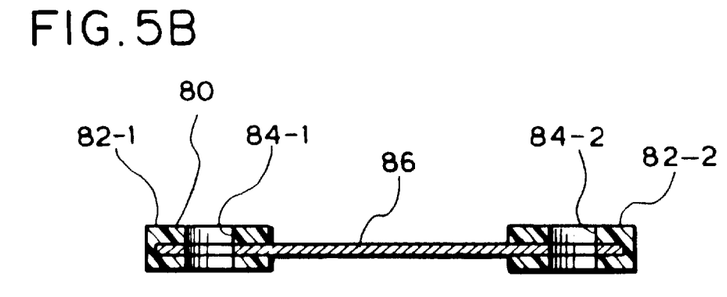

Next, the third preferred embodiment of the motor device according to the present invention will be explained. In this embodiment, as shown in FIGS. 5A and 5B, the driving force conversion member 80 is in contact with the inner surface of the cover 12, and comprises contacting portions 82-1 and 82-2 and a thinned down portion 86.

In this third preferred embodiment, these contacting portions 82-1 and 82-2 are formed from a material which absorbs the sound of sliding movement.

The thinned down portion 86 is formed from a metallic material. Because the contacting portions 82-1 and 82-2 and the thinned down portion 86 are formed as one integral body, the convenience of manufacture of the driving force conversion member 80 is enhanced.

Further, through holes 84-1 and 84-2 are formed through the contacting portions 82-1 and 82-2 made from a material which absorbs the sound of sliding motion and are formed so as to allow the passage of the crank pin 36a and the pin 52. In this embodiment, since, except for the contacting portions, the driving force conversion member is made from a metallic material, accordingly the rigidity of the driving force conversion member itself is enhanced.

Fourth Embodiment

Next, the motor device according to the fourth preferred embodiment of the present invention will be explained. In this fourth preferred embodiment shown in FIGS. 6A and 6B, the through holes in the driving force conversion member are provided with stepped portions.

Figure 6A:
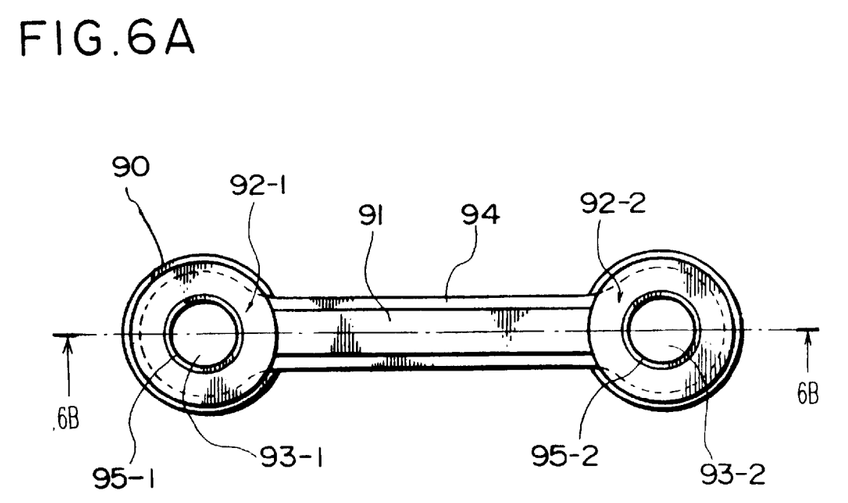
FIG. 6A is a plan view showing a driving force conversion member of still yet another preferred embodiment of the motor device of the present invention.
Figure 6B:
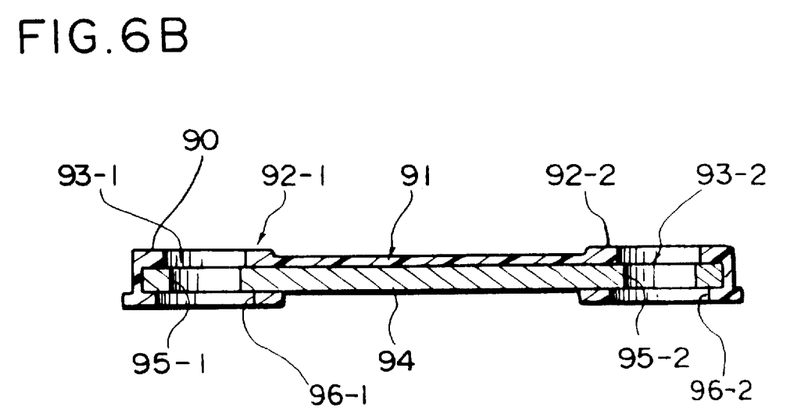
FIG. 6B is a sectional view taken as shown by the line E—E in FIG. 6A.

Referring to FIGS. 6A and 6B, the driving force conversion member 90 comprises a first member 94 which is formed from a metallic material and a second member 91 which is made from a material which is capable of absorbing the sound of sliding motion, for example a resin material.

This second member 91 includes contacting portions 92-1 and 92-2. And in each of the first and second members 94 and 91 of the driving force conversion member 90 there are formed first through hole 93-1 through which a pin 122 which serves as a shaft for oscillation is passed and second through hole 93-2 through which a crank pin which serves as an shaft for rotation is passed. Further, the second member 91 covers over the rear surface of the first member 94 in the regions in which the first and second through holes 93-1 and 93-2 are formed.

The through hole 93-1 includes a smaller diameter hole portion 95-1 and a larger diameter hole portion 96-1, and the through hole 93-2 includes a smaller diameter hole portion 95-2 and a larger diameter hole portion 96-2.

Figure 7:
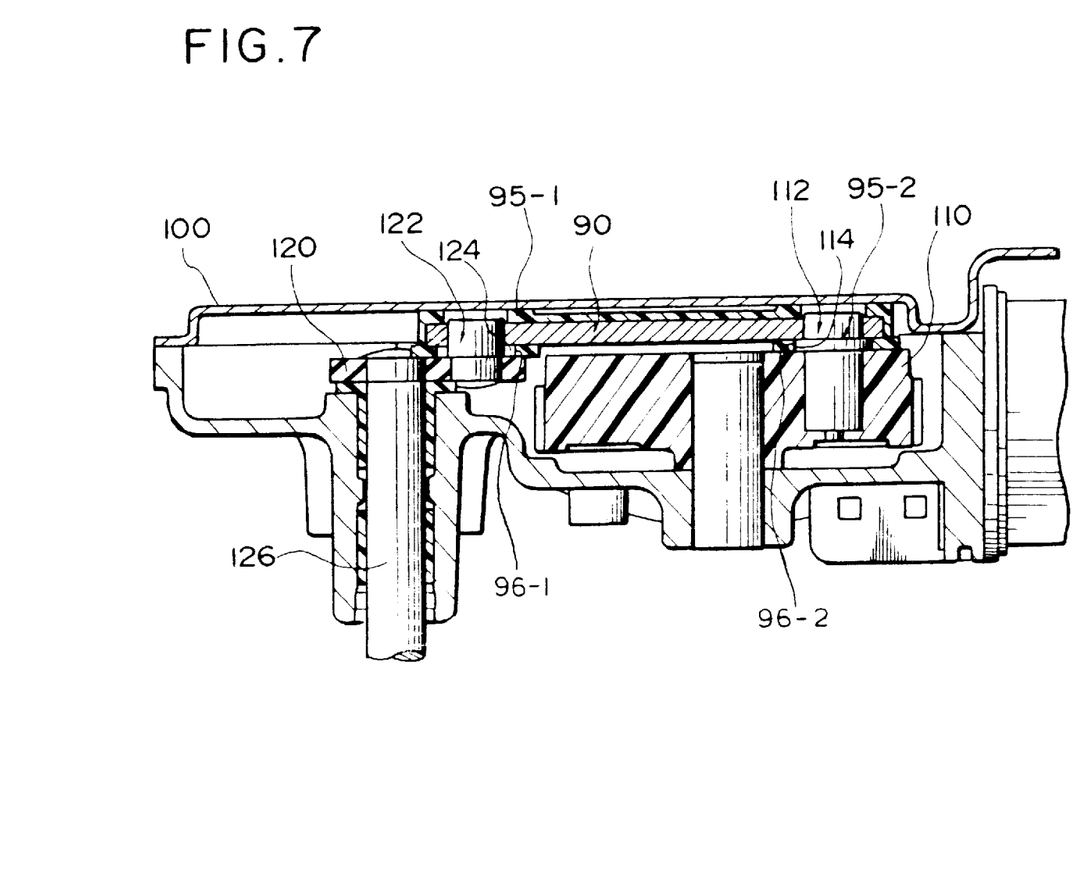
FIG. 7 is a partially cut away elevation view showing a motor device which utilizes the driving force conversion member shown in FIGS. 6A and 6B.

A motor device 100 which employs this type of driving force conversion member 90 is shown in FIG. 7. In this figure, the larger diameter hole portion 96-1 is engaged with an engaging portion 124 of flange form which is formed upon the pin 122. The pin 122 serves as an oscillation shaft for a sector gear 120 which is linked to an output shaft 126. Further, the larger diameter hole portion 96-2 is engaged with an engaging portion 114 of flange form which is formed upon the crank pin 112. The crank pin 112 serves as a fixing shaft for the worm wheel 110.

Because of this, the driving force conversion member 90 and the worm wheel 110, and the driving force conversion member 90 and the sector gear 120, are firmly coupled together, and no problem such as falling apart can occur. Further, the driving force conversion member 90 does not vibrate, and also no vibrational noise is generated. Moreover, the rigidity of the connecting portion of the driving force conversion member 90 between the contacting portions 92-1 and 92-2 is enhanced, since it is constructed in a double layer construction due to the superimposition of the first member 91 and the second member 94.

Furthermore, in the regions of the contacting portions 92-1 and 92-2, a triple layer construction is available due to the superimposition of the upper and lower first members 91 with the second member 94 between them.

It is noted that the one end of each of the crank pin 112 and the pin 122 on the side of the cover is structured as a free end portion which does not contact the inner wall. Due to this, the inner wall surface is prevented from becoming grooved due to the rotation of these pins. It goes without saying that the occurrence of play in the thrust direction is prevented.

According to the fourth preferred embodiment of the present invention as described above, the following beneficial effects are obtained.

(1) The driving force conversion member is supported by being sandwiched between the engaging portions and the inner wall of the hollow casing. By doing this, it is possible to stop the driving force conversion member falling off without employing any countermeasures such as washers for stopping such falling off. Further, by so arranging the structure that the end of the oscillation shaft on the side of the cover is a free end which does not contact anything, it is possible to prevent grooving of the inner surface of the cover due to sliding motion of the contacting portion thereagainst. With regard to the rotational shaft, the same good results described above is obtained.

(2) By forming the thinned down portion as a two layer superimposition of the first and the second member, not only is the connection in the region between the two contacting portions made solid, but also the rigidity of the driving force conversion member itself is enhanced.

Now, although for the convenience of description the device of the present invention has been explained with reference to certain preferred embodiments thereof, various variations of the embodiments described in the specification of the present invention will be available to those skilled in the relevant art without deviating from the scope of the present invention. For example, although in the above described embodiments the driving force conversion member and the shaft bearings were made from a resin material, it would also be acceptable to utilize a material which had a low vibrational coefficient and which did not generate noise due to play during sliding motion. Further, since it is sufficient to make only at least one of the members which are in mutual sliding contact from a resin material or from a material which is capable of absorbing sound generated due to sliding contact, accordingly the particular combination is not essential. In addition, it would be acceptable for the contacting portion to be formed only in the region of the crank pin 112, or only in the region of the pin 122, or to be formed in all of the crank pin 112, the pin 122, and the intermediate region of the crank pin 112 and the pin 122.

Further, the above described larger diameter hole portions and engaging portions are not limited to being of stepped construction; various changes, such as making them wedge shape, or concave convex shape or the like, are also possible.

Yet furthermore, the present invention can also be applied to a mechanism which has the same function as the linkage mechanism (crank/lever mechanism) in the embodiments described above, or to a motor device to which some other mechanism has been appended. And, finally, it is also possible appropriately to apply a motor device of the type described above as, for example, a motor for a wiper device of an automobile or the like.

What is claimed is:

1. A motor device having a hollow casing, in which a mechanism for converting continuous rotational motion of a rotational member which is rotated by a motor into reversible rotational motion while contacting a first inner wall of said hollow casing and for transmitting the converted motion to an output shaft, comprising:

an oscillating member which oscillates about said output shaft; and a driving force conversion interposed between said oscillating member and said rotational member, which converts continuous rotational motion of said rotational member into reciprocating oscillator motion of said oscillating member;

wherein said driving, force conversion member comprises at least one contacting portion which projects toward a second inner wall of said hollow casing which is opposed to said first inner wall thereof, said one contactinig portion being formed as one unitary body with said driving force conversion member; and wherein said at least one contacting portion slides on said second inner wall of said hollow casing over the range of movement of said driving force conversion member, and is formed from a material which is capable of absorbing sound generated by sliding motion.

2. The motor device of claim 1, wherein said driving force conversion member is entirely, including said at least one contacting portion, formed from a material which is capable of absorbing sound generated by sliding motion.

3. The motor device of claim 1, wherein said driving force conversion member includes a plurality of thickened portions and a thinned down portion which connects together said thickened portions; and wherein said contacting portions are formed in the region of said thickened portions.

4. The motor device of claim 3, wherein said thickened portions are made from a nonmetallic material, and said thinned down portion is made from a metallic material.

5. The motor device of claim 3, wherein said driving force conversion member is entirely made from a nonmetallic material.

6. The motor device of claim 3, wherein said driving force conversion member comprises:

a first member which has a first hole into which an oscillation shaft for supporting said oscillating member is inserted, and a second hole into which a rotation shaft for supporting said rotating member is inserted; and a second member which covers both surfaces of said first member in the regions in which said first and said second holes are formed;

wherein said second member is formed from a material which is capable of absorbing sound generated by sliding motion.

7. The motor device of claim 6, wherein said second member comprises a connecting portion which connects together said contacting portions.

8. The motor device of claim 1, wherein said driving force conversion member comprises an oscillation shaft which supports and enables said oscillating member to oscillate, and a rotation shaft for rotatably supporting said rotating member; and wherein said at least one contacting portion of said driving force conversion member is formed at least in a region intermediate between the regions in which said oscillation shaft and said rotation shaft are provided.

9. The motor device of claim 1, wherein said driving force conversion member comprises an oscillation shaft which supports and enables said oscillating member to oscillate; and wherein said oscillation shaft comprises an engaging portion which engages with said driving force conversion member on the side opposite to said contacting portion.

10. The motor device of claim 1, wherein said driving force conversion member comprises a rotation shaft for rotatably supporting said rotating member; and wherein said rotation shaft comprises an engaging portion which engages with said driving force conversion member on the side opposite to said contacting portion.

11. The motor device of claim 1, wherein said driving force conversion member includes an oscillating shaft which supports and enables said oscillating member to oscillate; and said at least one contacting portion of said driving force conversion member is formed at least in a region adjacent to where said oscillation shaft is provided.

12. The motor device of claim 1, wherein said driving force conversion member comprises a rotation shaft for rotatably supporting said rotating member; and wherein said at least one contacting portion of said driving force conversion member is formed at least in a region adjacent to where said rotation shaft is provided.

13. The motor device of claim 1, wherein said rotating, member comprises a convex portion which is in contact with said first inner wall of said hollow casing.

14. The motor device of claim 13, wherein said convex portion is formed from a material which is capable of absorbing sound generated by sliding motion.

15. The motor device of claim 14, wherein said driving force conversion member comprises a rotation shaft for rotatably supporting said rotating member; and wherein each of said rotating member and said driving force conversion member has a hole portion which has a bottom into which a corresponding end portion of said rotatable shaft is inserted.

16. A wiper device comprising the motor device of claim 1.

17. A motor device, comprising:

a worm wheel which is housed within a hollow casing and is rotated by a motor while contacting a first inner wall of said hollow casing;

an output shaft which is rotatably supported by said hollow casing;

a sector gear which oscillates about said output shaft, a crank arm which rotates together with said worm wheel; and a piston arm which converts continuous rotational motion of said crank arm into reciprocating oscillatory motion of said sector gear;

wherein said piston arm comprises a contacting portion which is formed integrally with said piston arm and which projects toward a second inner wall of said hollow casing which is opposed to said first inner wall thereof;, and wherein said contactinig portion slides on said second inner wall of said hollow casing over the range of movement of said piston arm, and is formed from a material which is capable of absorbing sound generated by sliding motion.

18. A wiper device comprising the motor device of claim 17.

* * * * *